(12) United States Patent
Beauchamp et al.

(10) Patent No.: US 7,843,685 B2
(45) Date of Patent: Nov. 30, 2010

(54) DUCT SYSTEM FOR HIGH POWER ADAPTER CARDS

(75) Inventors: William Norris Beauchamp, Raleigh, NC (US); Karl Klaus Dittus, Durham, NC (US); Whitcomb Randolph Scott, III, Chapel Hill, NC (US); Jean Jidong Xu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 12/107,621

(22) Filed: Apr. 22, 2008

(65) Prior Publication Data

US 2009/0262497 A1 Oct. 22, 2009

(51) Int. Cl.
*H05K 5/00* (2006.01)
*H05K 7/20* (2006.01)
*G06F 1/20* (2006.01)
*A47B 81/00* (2006.01)

(52) U.S. Cl. ............. 361/679.49; 361/695; 361/679.46; 361/694; 361/679.51; 361/724; 361/679.48; 361/692; 454/184; 312/223.2

(58) Field of Classification Search .................. 361/695, 361/679.49, 679.46, 679.48, 679.51; 454/184; 312/223.2
See application file for complete search history.

(56) References Cited

U.S. PATENT DOCUMENTS

| | | | | |
|---|---|---|---|---|
| 4,035,711 A | * | 7/1977 | Piller | 363/174 |
| 5,297,005 A | * | 3/1994 | Gourdine | 361/697 |
| 5,424,915 A | * | 6/1995 | Katooka et al. | 361/695 |
| 5,440,450 A | * | 8/1995 | Lau et al. | 361/695 |
| 5,446,619 A | * | 8/1995 | Madsen et al. | 361/695 |
| 5,473,507 A | * | 12/1995 | Schwegler et al. | 361/690 |
| 5,493,457 A | * | 2/1996 | Kawamura et al. | 720/648 |
| 5,502,869 A | * | 4/1996 | Smith et al. | 15/326 |
| 5,544,012 A | * | 8/1996 | Koike | 361/695 |
| 5,694,294 A | * | 12/1997 | Ohashi et al. | 361/679.48 |
| 5,892,654 A | * | 4/1999 | Worden, Jr. | 361/690 |
| 5,946,188 A | * | 8/1999 | Rochel et al. | 361/690 |
| 5,949,646 A | * | 9/1999 | Lee et al. | 361/695 |
| 5,956,227 A | * | 9/1999 | Kitaoka | 361/695 |
| 6,011,689 A | * | 1/2000 | Wrycraft | 361/695 |
| 6,108,203 A | * | 8/2000 | Dittus et al. | 361/695 |
| 6,113,485 A | * | 9/2000 | Marquis et al. | 454/184 |
| 6,330,152 B1 | * | 12/2001 | Vos et al. | 361/688 |

(Continued)

*Primary Examiner*—Jayprakash N Gandhi
*Assistant Examiner*—Bradley H Thomas
(74) *Attorney, Agent, or Firm*—Cynthia G. Seal; Jeffrey L. Streets

(57) ABSTRACT

A method and apparatus for substantially preventing recirculation of heated air from an exhaust outlet of an expansion card to an air inlet of the expansion card, wherein the air inlet and exhaust outlet are both on the same end of the chassis. The apparatus comprises a chassis with a chassis fan, a motherboard within the chassis having an expansion card connector, and an expansion card in communication with the expansion card connector and secured to the front end of the chassis. The expansion card also includes a card fan configured to move cooling air through the air inlet to the exhaust outlet. An air duct redirects the hot air from the exhaust outlet to prevent recirculation into the expansion card and causes the heated air to exit through the chassis fan. The air duct may include a longitudinal segment through a computer module and a lateral segment selectively securable over the exhaust outlet.

10 Claims, 4 Drawing Sheets

U.S. PATENT DOCUMENTS

| | | | |
|---|---|---|---|
| 6,400,567 B1* | 6/2002 | McKeen et al. | 361/695 |
| 6,459,578 B1* | 10/2002 | Wagner | 361/694 |
| 6,466,448 B1* | 10/2002 | Baik | 361/752 |
| 6,483,699 B1* | 11/2002 | Salmonson et al. | 361/679.51 |
| 6,525,937 B2 | 2/2003 | Yanagida | |
| 6,556,440 B2* | 4/2003 | Jensen et al. | 361/679.46 |
| 6,618,248 B1* | 9/2003 | Dalheimer | 361/679.33 |
| 6,639,794 B2* | 10/2003 | Olarig et al. | 361/679.48 |
| 6,643,132 B2* | 11/2003 | Faneuf et al. | 361/700 |
| 6,678,157 B1* | 1/2004 | Bestwick | 361/695 |
| 6,704,196 B1* | 3/2004 | Rodriguez et al. | 361/679.33 |
| 6,704,199 B2* | 3/2004 | Wiley | 361/695 |
| 6,735,081 B1* | 5/2004 | Bishop et al. | 361/695 |
| 6,742,583 B2* | 6/2004 | Tikka | 165/291 |
| 6,804,115 B2* | 10/2004 | Lai | 361/695 |
| 6,934,161 B2 | 8/2005 | Kim et al. | |
| 6,970,353 B2* | 11/2005 | Brovald et al. | 361/679.5 |
| 6,991,533 B2* | 1/2006 | Tsai et al. | 454/184 |
| 6,999,312 B1* | 2/2006 | Garnett et al. | 361/679.54 |
| 7,019,969 B2 | 3/2006 | Foster, Sr. et al. | |
| 7,023,697 B2 | 4/2006 | Pokharna et al. | |
| 7,054,157 B2* | 5/2006 | Hirota et al. | 361/695 |
| 7,061,761 B2* | 6/2006 | Tucker et al. | 361/695 |
| 7,064,954 B1* | 6/2006 | Wu et al. | 361/695 |
| 7,068,505 B2* | 6/2006 | Kosugi | 361/690 |
| 7,120,018 B2* | 10/2006 | Shen et al. | 361/695 |
| 7,187,561 B2* | 3/2007 | Chang | 361/826 |
| 7,209,356 B2 | 4/2007 | Lee et al. | |
| 7,212,403 B2 | 5/2007 | Rockenfeller | |
| 7,245,485 B1* | 7/2007 | Morrell | 361/679.48 |
| 7,248,471 B2* | 7/2007 | Wabiszczewicz | 361/694 |
| 7,272,004 B2* | 9/2007 | Hirota et al. | 361/695 |
| 7,309,279 B2* | 12/2007 | Sharp et al. | 454/184 |
| 7,403,385 B2* | 7/2008 | Boone et al. | 361/692 |
| 7,468,884 B2* | 12/2008 | Carr et al. | 361/679.41 |
| 7,508,664 B2* | 3/2009 | Holland | 361/695 |
| 7,609,517 B2* | 10/2009 | Sun | 361/692 |
| 2003/0016496 A1* | 1/2003 | Kim et al. | 361/695 |
| 2003/0021088 A1* | 1/2003 | Jensen et al. | 361/687 |
| 2003/0095381 A1* | 5/2003 | Lee et al. | 361/687 |
| 2005/0111200 A1* | 5/2005 | Hardt et al. | 361/727 |
| 2005/0174737 A1 | 8/2005 | Meir | |
| 2005/0195568 A1* | 9/2005 | Shyr | 361/695 |
| 2005/0259392 A1* | 11/2005 | Vinson et al. | 361/687 |
| 2005/0259393 A1* | 11/2005 | Vinson et al. | 361/690 |
| 2006/0104027 A1* | 5/2006 | Vinson et al. | 361/695 |
| 2006/0120043 A1* | 6/2006 | Wolford et al. | 361/695 |
| 2007/0064387 A1* | 3/2007 | Matsumoto et al. | 361/690 |
| 2007/0119573 A1 | 5/2007 | Mahalingam et al. | |
| 2007/0133167 A1* | 6/2007 | Wagner et al. | 361/687 |
| 2007/0230114 A1* | 10/2007 | Bartell et al. | 361/687 |
| 2007/0236882 A1* | 10/2007 | Chen | 361/695 |
| 2007/0242432 A1 | 10/2007 | Campbell et al. | |
| 2008/0007912 A1 | 1/2008 | Matsushima et al. | |
| 2008/0023283 A1 | 1/2008 | Sutker et al. | |
| 2008/0024985 A1 | 1/2008 | Lee et al. | |
| 2008/0151491 A1* | 6/2008 | Baldwin et al. | 361/687 |
| 2008/0192429 A1* | 8/2008 | Woolsey et al. | 361/695 |
| 2008/0253076 A1* | 10/2008 | Chen | 361/684 |
| 2008/0285232 A1* | 11/2008 | Claassen et al. | 361/694 |

* cited by examiner

DUCT SYSTEM FOR HIGH POWER ADAPTER CARDS

BACKGROUND OF THE INVENTION

1. Field of the Invention

The present invention relates to thermal management of computer systems, and more specifically to the movement of air in a computer chassis.

2. Background of the Related Art

Computer systems are generally provided inside a chassis to provide physical support and air circulation for each of the individual components. A typical chassis will include a motherboard, one or more data storage device, a power supply and one or more chassis fan. The motherboard itself may include any number of standard heat-generating components, such as a processor, memory, basic input/output system (BIOS) and interconnecting circuitry. However, a motherboard may also include one or more expansion slots, such as a peripheral component interface (PCI) connector that allows the capability or capacity of the computer system to be expanded.

When a high power expansion card is installed on the motherboard, the chassis fans may not be sufficient to deal with the amount of localized heat-generation caused by operation of the expansion card. Accordingly, an expansion card, such as a high end video card, may include a heat sink and a fan (collectively referred to as an "active heatsink") to provide the amount of dedicated cooling necessary to operate the expansion card. Some of these active heatsinks direct airflow in the same direction as the chassis fan. However, it is not uncommon that an expansion card may direct airflow opposite to the direction of the chassis fan. For example, a front-mounted video card may draw cool air through an air inlet on the front end of the chassis and exhaust hot air through an exhaust outlet that is on the front end of the chassis immediately adjacent to the air inlet.

BRIEF SUMMARY OF THE INVENTION

One embodiment of the present invention provides an apparatus that substantially prevents recirculation of heated air from an exhaust outlet of an expansion card to an air inlet of the expansion card, wherein the air inlet and exhaust outlet are both on the front end of the chassis. The apparatus comprises a chassis including at least one chassis fan directed to move air in a first direction through the chassis from a front end to a back end, a motherboard disposed within the chassis and having an expansion slot adjacent the front end of the chassis, and an expansion card having an edge connector in communication with the expansion slot and a mounting bracket secured to the front end of the chassis. The expansion card also includes a card fan configured to move cooling air through an air inlet in the front end, move the cooling air across a portion of the expansion card to take on heat, and direct the heated air to an exhaust outlet in the front end. In addition, the apparatus includes an air duct having a first end secured in direct communication with the exhaust outlet, wherein the air duct redirects the heated air toward the back end of the chassis to a second end of the air duct that opens into communication with the at least one chassis fan, wherein the air duct substantially prevents recirculation of the heated air from the exhaust outlet to the air inlet and causes the heated air to exit through the at least one chassis fan.

Another embodiment of the invention provides a method comprising the steps of operating a card fan to cool an expansion card in a chassis by drawing in cool air from a front end of the chassis and exhausting heated air out the front of the chassis, preventing the heated air from recirculating into the expansion card, redirecting the heated air into a separate passageway of the chassis, and operating a chassis fan to move the heated air out a back end of the chassis.

DETAILED DESCRIPTION OF THE INVENTION

Figure 1:
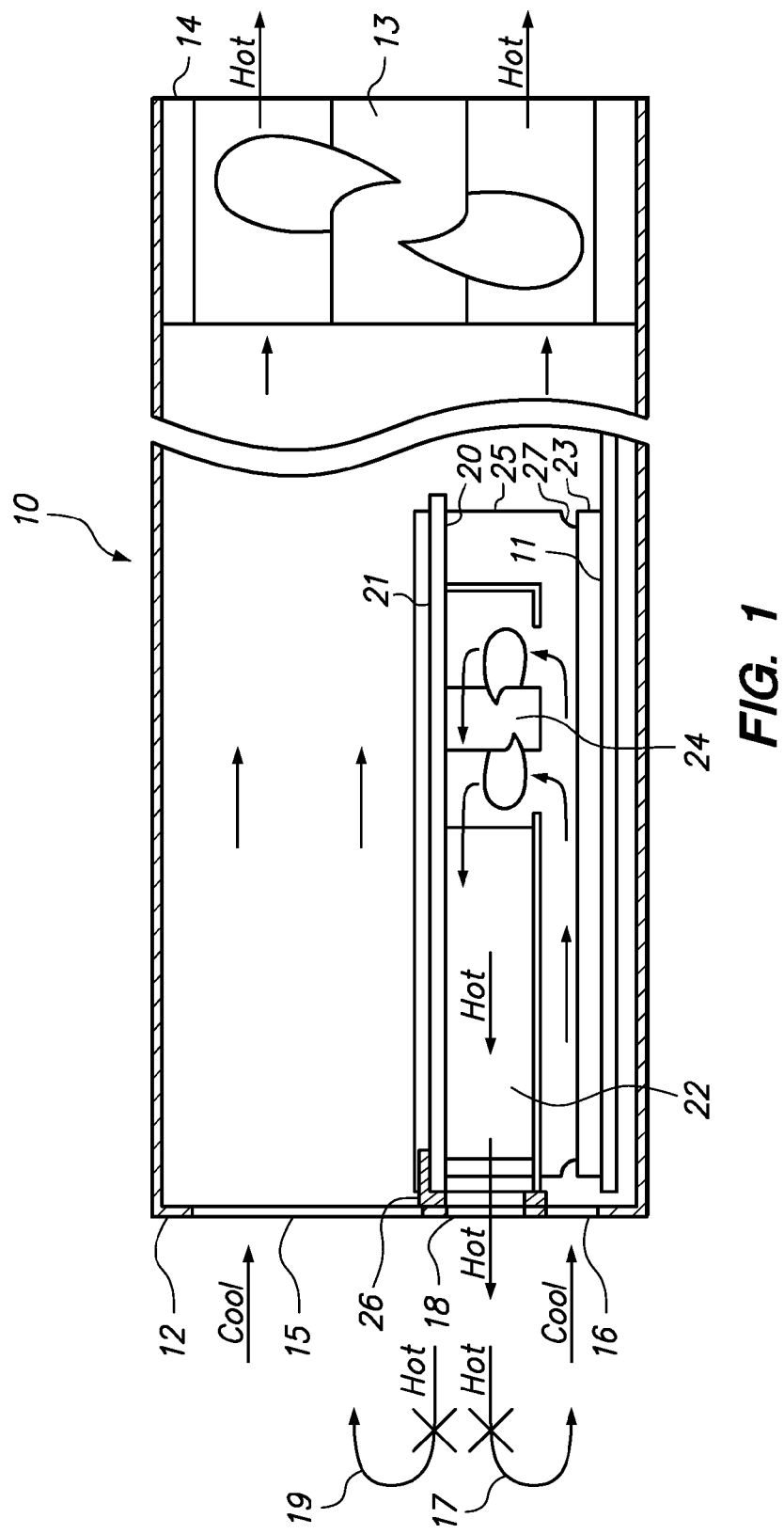
FIG. 1 is a schematic side view of a computer chassis with a front-mounted expansion card that exhausts hot air to the front of the chassis.

One embodiment of the present invention provides an apparatus that substantially prevents recirculation of heated air from an exhaust outlet of an expansion card to an air inlet of the expansion card, wherein the air inlet and exhaust outlet are both on the front end of the chassis. The apparatus comprises a chassis including at least one chassis fan directed to move air in a first direction through the chassis from a front end to a back end, a motherboard disposed within the chassis and having an expansion slot adjacent the front end of the chassis, and an expansion card having an edge connector in communication with the expansion slot and a mounting bracket secured to the front end of the chassis. The expansion card also includes a card fan configured to move cooling air through an air inlet in the front end, move the cooling air across a portion of the expansion card to take on heat, and direct the heated air to an exhaust outlet in the front end. In addition, the apparatus includes an air duct having a first end secured in direct communication with the exhaust outlet, wherein the air duct redirects the heated air toward the back end of the chassis to a second end of the air duct that opens into communication with the at least one chassis fan, wherein the air duct substantially prevents recirculation of the heated air from the exhaust outlet to the air inlet and causes the heated air to exit through the at least one chassis fan. In an optional implementation, the expansion slot is a PCI expansion slot and the expansion card in a PCI card.

In another embodiment, the air inlet to the expansion card, the exhaust outlet from the expansion card, or both are formed in the mounting bracket that secures the expansion card to the chassis. As a non-limiting example of such an embodiment, the air inlet is formed in the front end of the chassis and the exhaust outlet is formed in the mounting bracket. While the chassis fan or fan assembly directs air through the chassis in a first direction from front to back, such an exhaust outlet directs the heated air in a second direction that is generally opposite to the first direction.

In a further embodiment, the air duct includes a lateral duct segment and a longitudinal duct segment. A preferred longitudinal duct segment is a channel formed inside the chassis and a preferred lateral duct segment is selectively attachable to the front end of the chassis to direct heated air from the exhaust outlet into the longitudinal duct segment. Although the air inlet to the expansion card may be positioned immediately adjacent the exhaust outlet from the expansion card, the lateral duct segment prevents hot air exhaust from mixing the cool air being drawn into the air inlet. The longitudinal duct segment receives the hot air exhaust from the lateral duct segment and directs the hot air into the chassis to be moved out the back of the chassis according to the operation of the chassis fan assembly. It is preferable that the longitudinal duct segment is formed in an expansion module adjacent a compute module that secures the motherboard and the expansion card, wherein both the expansion module and the compute module are received within the chassis. Optionally, a riser card may be interposed between the expansion card and the expansion slot to position the expansion card in a generally parallel orientation with respect to the motherboard.

Yet another embodiment of the invention provides a method comprising the steps of operating a card fan to cool an expansion card in a chassis by drawing in cool air from a front end of the chassis and exhausting heated air out the front of the chassis, preventing the heated air exiting the front of the card from recirculating into the expansion card, redirecting the heated air into a separate passageway of the chassis, and operating at least one chassis fan to move the heated air out a back end of the chassis. Preferably, the expansion card has an edge connector received in an expansion slot on a motherboard. It is also preferable that the step of redirecting the heated air into the chassis includes selectively securing a lateral duct segment to the front of the chassis.

FIG. 1 is a schematic side view of a computer chassis 10 with a front-mounted expansion card 20 having an edge connector 21 is coupled to, and in communication with, an expansion slot 23 on a motherboard 11. In this embodiment, the expansion card 20 is oriented parallel to the motherboard 11 using a riser card 25 having its own edge connector 27 received in the expansion slot 23. The edge connector 21 of the expansion card 20 may be the same type as the edge connector 27 of the riser card 25. Such a configuration may be desirable to reduce the overall height of the chassis 10 or individual modules within the chassis. The expansion card 20 also includes a mounting bracket 26 secured to the front end of the chassis. The expansion card 20 further includes a heat exchanger 22 and a fan 24 that draws in cool air through an air inlet 16 on the front end 12 of the chassis 10 and exhausts hot air through an exhaust outlet 18 on the front end 12 of the chassis. As shown, the cool air passes under the expansion card 20, enters the fan 24 and is blown through the fins of the heat sink 22 before the hot air is released from the exhaust outlet 18. Various embodiments of the invention are able to substantially prevent recirculation of hot air from the exhaust outlet 18 to the air inlet 16 (See arrow 17), even though the outlet and inlet are positioned adjacent on the same end of the chassis. Furthermore, various embodiments of the invention are able to avoid mixing the hot air from the exhaust outlet 18 with the cool air entering the chassis through another inlet 15 as a result of operating the chassis fan 13. Both the direct recirculation of hot air into the expansion card and the mixing of hot air into the cooling air can lead to high temperatures within the expansion card or the chassis, respectively. In turn, the higher temperatures cause the expansion card fan or the chassis fan to run faster in an attempt to keep component temperatures within desirable operating ranges. This consumes an excessive amount of electricity and produces undesirable levels of noise. Ultimately, if the fans cannot sufficiently cool the components, a thermal trip could occur and shutdown the system.

Figure 2:
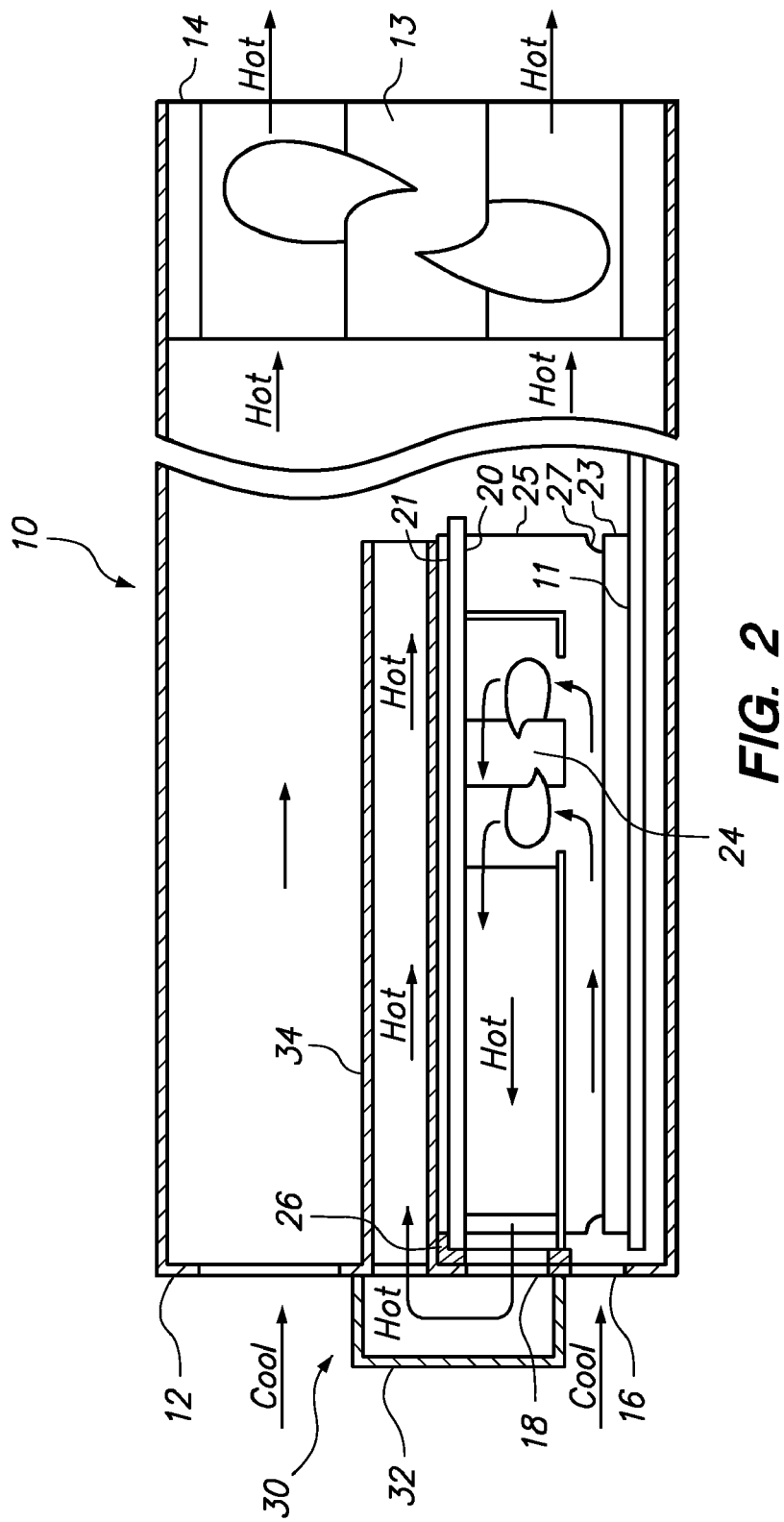
FIG. 2 is a schematic side view of a computer chassis with a front-mounted expansion card and an air duct for preventing recirculation of the hot air.

FIG. 2 is a schematic side view of the computer chassis 10 with the expansion card 20 coupled to the motherboard 11 and an air duct 30 for preventing recirculation of the hot air coming out of the exhaust outlet 18. The air duct 30 redirects the flow of hot air back into the chassis and channels the hot air toward the back 14 of the chassis 10 where it is exhausted through the chassis fan 13. Accordingly, undesirable recirculation (See arrow 17 in FIG. 1) and undesirable mixing (See arrow 19 in FIG. 1) of the hot air is substantially prevented. It should be recognized that the present air duct 30 is a hot air duct, not a cool air duct as is used to distribute cool air throughout a chassis.

In the embodiment of FIG. 2, the air duct 30 is constructed in two segments. A first segment 32 is secured to the front end 12 of the chassis and is placed in communication with the exhaust outlet 18. The first segment 32 is preferably selectively securable to the chassis after installation of the expansion card 20. However, if the expansion card 20 is a low power card without a card fan and presumably designed for airflow caused by the chassis fan 13, then the first segment 32 would not be installed. A second segment 34 of the air duct 30 provides a longitudinal channel that directs the hot air toward the chassis fan 13 while substantially preventing mixing with the cooling air being used to cool other components in the chassis. Preferably, the second segment 34 extends rearwardly into the chassis to a point downstream of any components that would be affected by the hot air. Although the invention is not limited to air ducts that are segmented, the detachable and selectively securable segment 32 accommodates convenient installation of the expansion card and provides compatibility with low power expansion cards.

Figure 3:
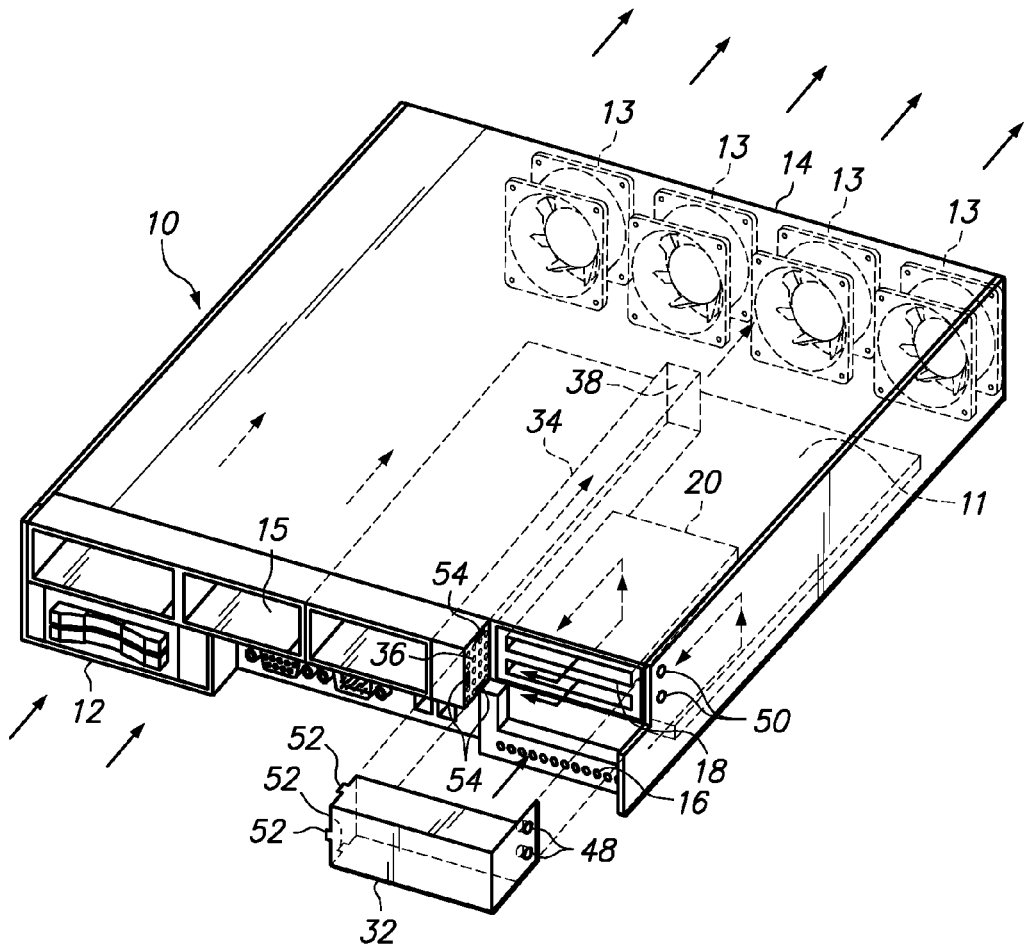
FIG. 3 is a perspective view of a computer chassis adapted to secure an air duct segment that redirects the hot air exhaust into a dedicated channel.

FIG. 3 is a perspective view of the computer chassis 10 having a front end 12 adapted to secure the air duct segment 32 in order to redirect the hot air from the exhaust outlet 18 into a dedicated channel 34. Consistent with the schematic views of FIGS. 1-2, the expansion card 20 draws cool air in through the air inlet 16 and releases hot air through the air outlet 18. When the first air duct segment 32 is secured to the chassis, the segment 32 covers the exhaust outlet 18 and redirects the hot air laterally to the second air duct segment 34, thereby substantially preventing hot air recirculation into the expansion card inlet 16. An inlet to the second air duct segment 34, shown here covered by a perforated metal plate 36, is formed near the front end 12 of the chassis. The second air duct segment or channel 34 is longitudinally directed through the chassis and prevents mixing with other cooling air being drawn through the chassis 10. Although the hot air may flow through the air duct segments 32, 34 under the high outlet pressure of the card fan (not shown), the flow of the hot air is also aided or driven by the low inlet pressure to the chassis fans 13 near the outlet end 38.

Figure 4:
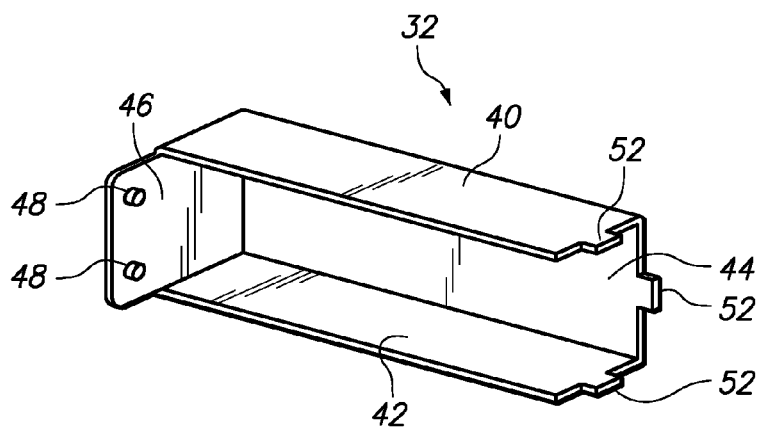
FIG. 4 is a perspective view of the air duct segment.

FIG. 4 is a perspective view of the air duct segment 32. The segment 32 has a top wall 40, a bottom wall 42, a side wall 44 and one end wall 46. The end wall 46 has a pair of pegs 48 that can be selectively inserted into mating holes 50 (See FIG. 3) in the chassis 10 or a module within the chassis, depending upon actual structure that secures the exhaust outlet 18. At the open end of the air duct segment 32, tabs 52 extend laterally from the walls 40, 42, 44 for selective insertion into mating slots 54 (See FIG. 3) in the perforated metal plate 36.

Figure 5:
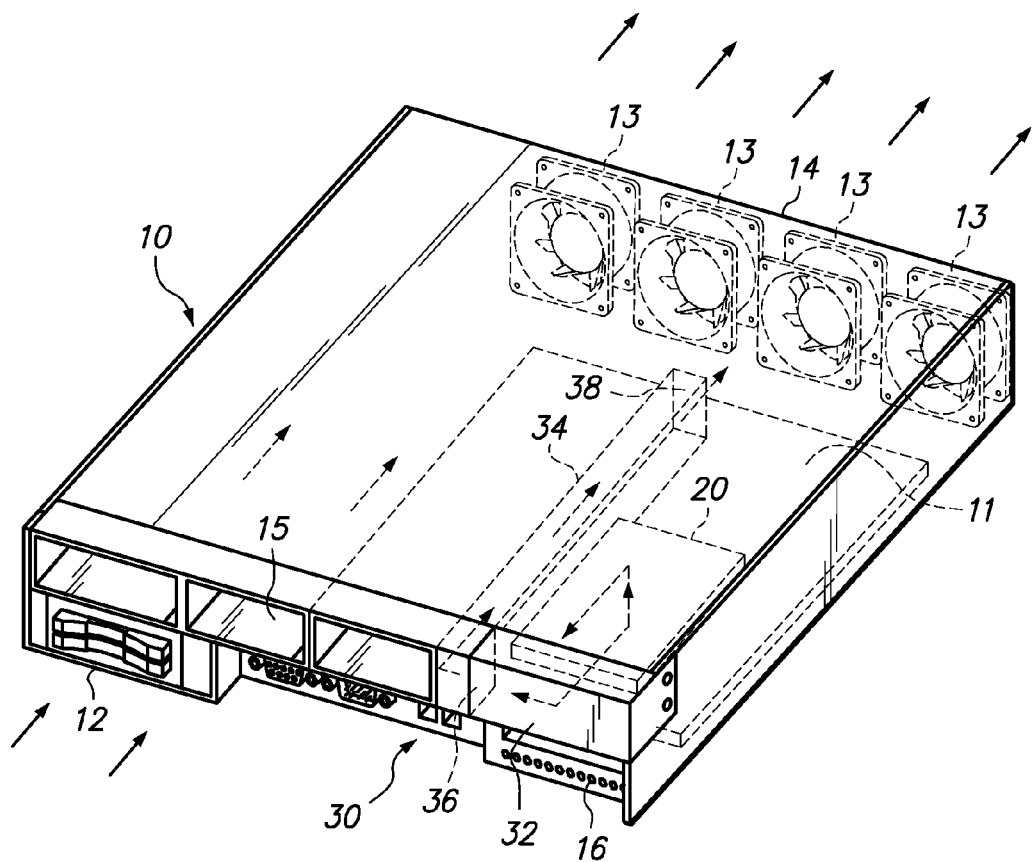
FIG. 5 is a perspective view of the computer chassis with the air duct segment secured over the hot air exhaust port of the expansion card.

FIG. 5 is a perspective view of the computer chassis 10 with the air duct segment 32 secured over the hot air exhaust port 18 of the expansion card 20. With the lateral air duct segment 32 secured in communication between the front exhaust port 18 and the longitudinal air duct segment 34, the air duct 30 is able to substantially prevent recirculation of hot air to the air inlet 16 and substantially prevent mixing of the hot air with cool air entering the chassis 10 through other ports 15.

Figure 6:
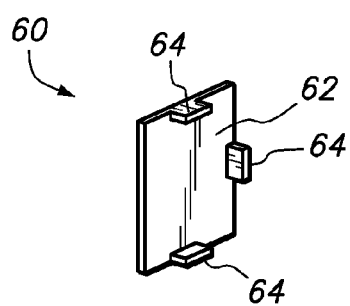
FIG. 6 is a perspective view of an air duct cap.

FIG. 6 is a perspective view of an air duct cap 60 that is selectively securable to the perforated metal plate 36 (See FIG. 3). The air duct cap 60 includes a simple flat plate 62 with three tabs 64 around the perimeter in order to secure the cap to the slots 54 in the perforated metal plate 36 in a similar manner to the attachment of the lateral air duct segment 32. The cap 60 is preferably secured to the plate 36 at the inlet to the longitudinal air duct segment 34 whenever the lateral air duct segment is not being used. The installation of the cap 60 isolates the channel 34 and prevents cool air from the front of the chassis passing through the channel 34 where there are no components to cool. The cap prevents this bypassing and forces more air through the other openings to the chassis, thus making better use of the chassis fans. It should be recognized that the cap is preferably installed (rather than the lateral air duct segment) when either there is no expansion card installed or the installed expansion card is designed for airflow in the same direction as the chassis fans.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a chassis including at least one chassis fan directed to move air in a first direction into the chassis through a front end and out of the chassis through a back end;
   a motherboard disposed within the chassis, the motherboard having an expansion slot adjacent the front end of the chassis;
   an expansion card having an edge connector in communication with the expansion slot, a mounting bracket secured to the front end of the chassis, and a card fan configured to move cooling air through a first air inlet, move the cooling air across a portion of the expansion card to remove heat from the expansion card, and direct the heated air to an exhaust outlet in the front end of the chassis; and
   an air duct having a first end secured in direct communication with the exhaust outlet, wherein the air duct redirects the heated air toward the back end of the chassis to a second end of the air duct that opens into communication with the at least one chassis fan, wherein the air duct substantially prevents recirculation of the heated air from the exhaust outlet to the first air inlet and causes the heated air to exit through the at least one chassis fan, wherein the air duct includes a lateral duct segment and a longitudinal duct segment, wherein the longitudinal duct segment is a channel formed inside the chassis, and wherein the lateral duct segment is selectively attachable to the front end of the chassis to direct the heated air from the exhaust outlet into the longitudinal duct segment.

2. The apparatus of claim 1, wherein the expansion slot is a PCI expansion slot and the expansion card is a PCI card.

3. The apparatus of claim 1, further comprising:
   a riser card interposed between the expansion card and the expansion slot to position the expansion card in a generally parallel orientation with respect to the motherboard.

4. The apparatus of claim 1, wherein the first air inlet and the exhaust outlet are formed in the mounting bracket.

5. The apparatus of claim 1, wherein the first air inlet is formed in the front end of the chassis and the exhaust outlet is formed in the mounting bracket.

6. The apparatus of claim 1, wherein the exhaust outlet directs the heated air in a second direction that is generally opposite to the first direction.

7. The apparatus of claim 1, wherein the first air inlet to the expansion card is immediately adjacent the exhaust outlet from the expansion card.

8. The apparatus of claim 7, wherein the exhaust outlet is positioned above the first air inlet.

9. The apparatus of claim 1, further comprising:
   a cap selectively securable over a second air inlet to the longitudinal duct segment in the absence of an installed lateral duct segment.

10. The apparatus of claim 9, wherein securing the cap over the second air inlet to the longitudinal duct segment prevents the passage of cool air through the longitudinal duct segment.

* * * * *